Patented July 6, 1937

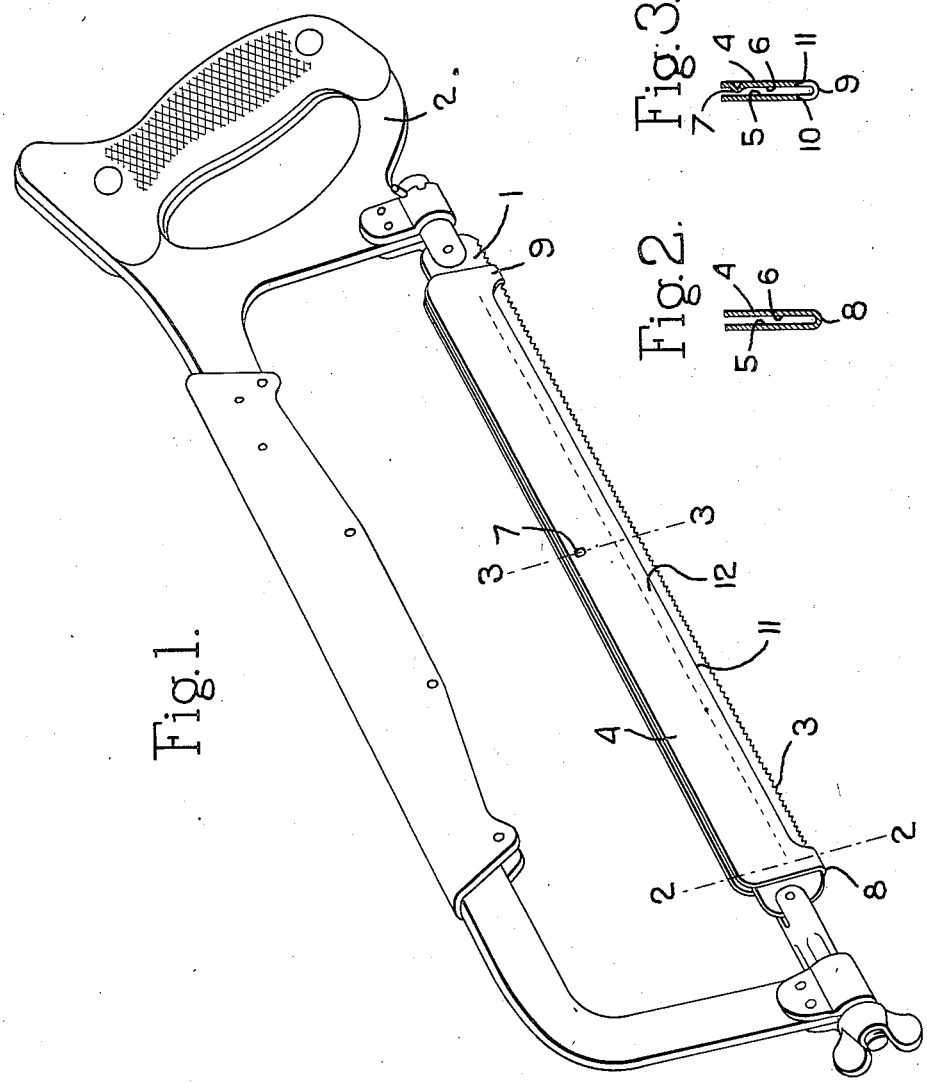

2,085,999

UNITED STATES PATENT OFFICE 2,085,999

SAW ADAPTER

Michael J. Radecki and Douglas Campbell Smyth, New Haven, Conn., assignors to The Henry G. Thompson & Son Co., New Haven, Conn., a corporation of Connecticut Application July 22, 1936, Serial No. 91,839

2 Claims. (Cl. 145—35)

This invention has for its object to provide a simple and efficient means for accurately and surely limiting the depth of cut made by a saw, and particularly a hack saw, in the work being cut.

While the invention is applicable to a wide range of uses, it is particularly useful in cutting through such articles as the lead sheath of a BX electric cable. In such work it is extremely important that the cutting operation shall be made quickly and easily, shall completely sever the lead sheath, but shall not cut into the insulation of the wires.

The object of the invention is to provide such a device which may readily be applied to the saw blade and the position of which on the saw blade cannot be disturbed or varied by the cutting operation but on the contrary shall be insured and maintained by the very cutting pressure itself.

These and other objects and features of the invention will appear more fully from the accompanying description and drawing and will be particularly pointed out in the claims.

The drawing represents a preferred form of the invention as applied to an ordinary type of hack saw blade for hand operation.

In the drawing:

Fig. 1 is a perspective view of a hack saw equipped with a device embodying the invention.

Fig. 2 is a view in cross section of the device taken on the line 2—2 of Fig. 1.

Fig. 3 is a view in cross section of the device taken on the line 3—3 of Fig. 1.

A hack saw blade 1 of a well-known and familiar type is illustrated in Fig. 1 mounted in a standard hack saw frame 2. Such a blade is typical only, so far as the present invention is concerned, of any saw blade having a straight, toothed edge 3.

In cutting many classes of work, it is important that the saw blade shall cut the work only to a limited depth and that this depth of cut shall be capable of accurate predetermination. Furthermore, the means employed for predetermining the limit of depth must be readily applied to and removed from the saw blade or else the saw blade cannot be used for other purposes and would become a very special tool.

The present invention is embodied in a metal plate 4 somewhat shorter than the saw blade and of U shape cross section and of such size that its opposing walls 5 and 6 act frictionally to engage and grip the saw blade, between the points of attachment of the blade to the saw frame, when the saw blade is forced therebetween. Preferably this frictional engagement is facilitated by forming one or more small projections 7 on the walls.

Only the end portions of this U-shaped plate are continuous, as indicated at 8 and 9, and the position of the device or adapter upon the saw blade is determined by these end portions 8 and 9 at the bottom of the U bend engaging the points of the teeth of the saw blade adjacent the ends of the saw blade, as shown in Fig. 1.

The entire remainder of the U-shaped bend of the plate forming the adapter, that is, the entire portion between the end portions 8 and 9, is removed to leave parallel, straight, lower edges 10 and 11 equidistant from the line of points of the teeth 3. Thus the edges 10 and 11 always being equidistant from the teeth of the saw engage the work being cut when the prescribed depth of cut has been reached and thus accurately insure a predetermined depth of cut.

In the preferred form of the invention, a zone 12 of each plate wall terminating at the said lower edges 10 and 11 is hardened by the usual process employed in metal hardening so as to minimize wear when the edges of the adapter rub on the work being cut and so also as to prevent these edges from being roughened by wear or in any way acting upon the work being cut or effecting the predetermined depth of cut.

It will be seen that the device may be readily placed upon and removed from any saw blade for which it is adapted and that when in place the cutting pressure applied to the work cannot disturb the adapter from its position on the saw blade but instead only acts to insure and maintain the proper position of the adapter and thus to insure and maintain a constant and uniform depth of cut.

The adapter may be made of any suitable metal but is preferably made of a soft steel plate with the edges hardened as described.

The adapter, being a one-piece structure, has no movable parts and no adjustments and therefore cannot get out of order and always ensures a limit of depth of cut predetermined by the fixed distance from the inner surface of the U-bend, where the line of points of the saw blade teeth contact, to the parallel, straight, lower edges. The adapter, being quite inexpensive because of its simple structure, may be made up in several sizes, that is, for different depths of cut and thus provision made for any desired range of depths of cut.

Having thus described the invention, what is claimed as new, and desired to be secured by Letters Patent, is:

1. An adapter for a straight toothed-edged saw blade for limiting the depth of cut consisting of an elongated metal plate of U-shape cross section and somewhat shorter than the saw blade with its opposing walls acting frictionally to engage and grip the saw blade when forced therebetween, with the end portions of the plate at the bottom of the U-bend acting to engage the points of the teeth adjacent the ends of the saw blade and position the adapter, with the remainder of the U-bend removed to leave parallel straight lower edges equidistant from the line of the points of the teeth for engaging the work being cut and thus limiting the depth of cut, and with the cutting pressure acting to insure and maintain the position of the adapter on the saw blade.

2. An adapter for a straight toothed-edged saw blade for limiting the depth of cut as defined in claim 1, in which zones of the plate walls terminating at the said lower edges are hardened to resist wear and maintain a constant and uniform depth of cut.

MICHAEL J. RADECKI.
DOUGLAS CAMPBELL SMYTH.